United States Patent
Jensen et al.

(10) Patent No.: US 6,346,494 B1
(45) Date of Patent: *Feb. 12, 2002

(54) MAN-MADE VITREOUS FIBRES

(75) Inventors: Soren Lund Jensen, Kobenhavn K; Vermund Rust Christensen, Roskilde; Marianne Guldberg, Soborg, all of (DK)

(73) Assignee: Rockwool International A/S (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/349,815

(22) Filed: Jul. 9, 1999

Related U.S. Application Data

(63) Continuation-in-part of application No. 08/836,537, filed on May 8, 1997, now Pat. No. 5,935,886, which is a continuation-in-part of application No. PCT/EP95/04395, filed on Nov. 8, 1995, which is a continuation-in-part of application No. 08/836,516, filed on May 8, 1997, now Pat. No. 5,932,500, which is a continuation-in-part of application No. PCT/EP95/04394, filed on Nov. 8, 1995, which is a continuation-in-part of application No. PCT/EP98/03978, filed on Jun. 30, 1998, and a continuation-in-part of application No. PCT/EP98/03979, filed on Jun. 30, 1998, and a continuation-in-part of application No. PCT/EP98/03980, filed on Jun. 30, 1998.

(51) Int. Cl.[7] .......................... C03C 13/06; C03C 13/02
(52) U.S. Cl. .............................. 501/36; 501/35; 501/38
(58) Field of Search ............................... 501/35, 36, 38

(56) References Cited

U.S. PATENT DOCUMENTS

| | | | |
|---|---|---|---|
| 2,020,403 A | 11/1935 | Engle | |
| 2,300,930 A | 11/1942 | Johnson et al. | 106/50 |
| 2,576,312 A | 11/1951 | Minnick | |
| 3,736,162 A | 5/1973 | Chvalovsky et al. | |
| 4,002,482 A | 1/1977 | Coenen | |
| 4,205,992 A | 6/1980 | Mogensen et al. | |
| 4,363,878 A | 12/1982 | Yamamoto et al. | |
| 4,461,840 A | 7/1984 | Massol et al. | |
| 4,560,606 A | 12/1985 | Rapp et al. | |
| 4,917,750 A | 4/1990 | Deutsche | |
| 4,950,355 A | * 8/1990 | Klose | 156/204 |
| 5,037,470 A | 8/1991 | Matzen et al. | |
| 5,250,488 A | 10/1993 | Theolohan et al. | |
| 5,312,806 A | 5/1994 | Mogensen | |
| 5,571,610 A | 11/1996 | Loftus et al. | |
| 5,576,252 A | 11/1996 | Rapp et al. | |
| 5,736,475 A | * 4/1998 | Bakhshi et al. | 442/415 |
| 5,932,500 A | 8/1999 | Jensen, et al. | |
| 5,935,886 A | * 8/1999 | Jensen et al. | 501/36 |
| 5,958,808 A | * 9/1999 | Mori et al. | 501/38 |
| 5,962,354 A | * 10/1999 | Fyles et al. | 501/36 |
| 6,043,170 A | * 3/2000 | Steinkopf et al. | 501/36 |

FOREIGN PATENT DOCUMENTS

| | | |
|---|---|---|
| DE | 29515168 | 3/1996 |
| EP | 0021781 | 1/1981 |
| EP | 0057397 | 8/1982 |
| EP | 057397 A1 | 11/1982 |
| EP | 0231691 | 8/1987 |
| EP | 0408428 A2 | 1/1991 |
| EP | 0408428 | 1/1991 |
| EP | 0459897 | 12/1991 |
| EP | 0057397 | 8/1992 |
| EP | 0583791 | 2/1994 |
| EP | 0412878 | 3/1994 |
| FR | 2662687 | 5/1993 |
| FR | 2726548 | 5/1996 |
| GB | 2005746 | 4/1979 |
| GB | 2005746 A | 4/1979 |
| GB | 2152026 A | 7/1985 |
| PL | 160196 | 2/1993 |
| SE | 197942 | 8/1965 |
| SU | 458522 | 3/1975 |
| SU | 649670 | 3/1979 |
| SU | 1724613 A1 | 4/1992 |
| WO | 87/05007 | 8/1987 |
| WO | 89/12032 | 12/1989 |
| WO | 92/09536 | 6/1992 |
| WO | 93/22251 | 11/1993 |
| WO | 94/14717 | 7/1994 |
| WO | 96/14274 | 5/1996 |
| WO | 96/14454 | 5/1996 |
| WO | 96/36573 | 11/1996 |
| WO | 97/21636 | 6/1997 |

OTHER PUBLICATIONS

T. Lakatos, et al., "Viscosity and Liquidus Temperature Relations in the Mineral—Wool Part of the System $SiO_2$—$Al_2O_3$—CaO—MgO—Alkalies—FeO—$Fe_2O_3$," Glasteknisk Tidskirift 36 1981:4 pp. 51–55.

"Fiber Diameter Distributions In Typical MMVF Wool Insulation Products"; Vermund R. Christensen, et al.; American Industrial Hygiene Associate; May 1993; pp. 233–238.

Kenneth K. Humphreys, et al.; "Coal Ash Usage: Producing Mineral Wool From By–Products"; *Mineral Processing*, Mar. 1970, pp. 16–21.

V.R. Christensen, et al.; "Effect of Chemical Composition of Man–Made Vitreous Fibers on the Rate of Dissolution in Vitro at Different pHs"; *Evironmental Health Perspectives*; 102 (Supp. 5): 83–86 (1994) (Oct.).

Sylvie Thelohan, et al.; "In Vitro Dynamic Solubility Test: Influence of Various Parameters"; *Environmental Health Perspectives*; 102 (Suppl. 105): 91–96 (1994) (no month).

Mansville, PCT/US87/00313, "Table III"; p. 10 (no date).

* cited by examiner

*Primary Examiner*—Karl Group
(74) *Attorney, Agent, or Firm*—Ostrolenk, Faber, Gerb & Soffen, LLP

(57) ABSTRACT

Man-made vitreous fibers have a solubility of pH 4.5 of at least 20 nm per day and a melt viscosity of 10 to 70 poise at 1400° C. Novel fibers contain at least 18% $Al_2O_3$. Particular products include external wall insulation or cladding and pipe sections. A composition for making suitable fibres may be selected by determining solubility at pH 4.5 or in macrophage.

24 Claims, No Drawings

MAN-MADE VITREOUS FIBRES

RELATED APPLICATIONS

This application is a continuation in part of U.S. Ser. No. 08/836537 filed May 8, 1997 (now U.S. Pat. No. 5,935,886) which is a CIP of PCT/EP95/04395 of Nov. 8, 1995 by Soren Lund Jensen, Vermund Rust Christensen and Marianne Guldberg, and of U.S. Ser. No. 08/836,516 filed May 8, 1997 (now U.S. Pat. No. 5,932,500) which is a CIP of PCT/EP95/04394 of Nov. 8, 1995 by the said Jensen Christensen and Guldberg and of the US designations of each of PCT/EP98/03978, PCT/EP98/03979 and PCT/EP98/03980 all filed Jun. 30, 1998 by the said Guldberg and Jensen.

The entire disclosure of each of the said US applications and each of the said PCT applications is herein incorporated by reference.

FIELD OF THE INVENTION

This invention relates to man-made vitreous fibres (MMVF) which are durable in use but which can be shown to be biologically advantageous, to products containing the fibres, to the uses of such products, and to methods of making the fibres.

BACKGROUND TO THE INVENTION

MMV fibres are made from vitreous melt, such as of rock, slag, glass or other mineral melts. The melt is formed by melting in a furnace a mineral composition having the desired analysis. This composition is generally formed by blending rocks or minerals to give the desired analysis. The mineral composition often has an analysis, as oxides, which includes at least 32% $SiO_2$, below 30% $Al_2O_3$ and at least 10% CaO. The elemental analyses in the specification are by weight and calculated as oxides. The iron oxide may be a mixture of FeO and $Fe_2O_3$ but is quoted herein as FeO.

Efficient and cost-effective formation of the melt in the furnace and of the fibres from the melt requires that the composition should have a suitable liquidus temperature and should have a suitable viscosity during the fibre-forming process. These requirements impose constraints on the selection of the composition that is to be melted.

Although there is no scientific evidence establishing that there is a health risk associated with the manufacture and use of MMV fibres, commercial interests have led manufacturers to provide MMV fibres that retain the required physical properties of MMV fibres (e.g., durability at elevated temperatures and under humid conditions) but which can also be alleged to be of improved biological safety.

This allegation of improved safety is usually made on the basis of an in vitro test that examines the dissolution rate or degradability of the fibres in a liquid which is intended to simulate lung liquid, such as Gamble's solution with pH 7.4 to 7.8. A consequence of enhanced dissolution rate at pH 7.5 is that the fibres will normally have reduced resistance to humidity.

Numerous patent applications have been published describing fibres that give enhanced dissolution rate in such an in vitro test, such as WO87/05007, WO89/12032, EP 412878, EP459897, WO92/09536, WO93/22251 and WO94/14717.

A characteristic of many of these patent applications, and of fibres which are alleged to have enhanced dissolution rate in such in vitro tests, is that the fibre should have reduced aluminium content. For instance it is stated in WO87/05007 that the $Al_2O_3$ amount must be below 10%. The aluminium content of rock wool and slag wool is generally in the range 5 to 15% (measured as $Al_2O_3$ by weight) and many of these allegedly biologically suitable fibres have an aluminium content of below 4%, and often below 2%. It is known to include phosphorous in these low-$Al_2O_3$ compositions in order to increase the dissolution rate in this pH 7.5 dissolution rate test.

A problem with many of these low-$Al_2O_3$ fibres (in addition to uncertainty as to whether they do have enhanced biological suitability) is that the melt properties are not entirely satisfactory for manufacture in conventional or easily adapted melting and fibre-forming apparatus. For instance the melt viscosity at convenient fibre-forming temperatures may be rather low. Another problem is that a high dissolution rate at pH 7.5 may tend to result in reduced durability under humid conditions which may be experienced after installation.

In addition to the in vitro tests, in vivo research testing has been conducted. For instance Oberdörster in VDI Berichte 853, 1991, pages 17 to 37 showed that two basic mechanisms are involved in the clearance of fibres from the lungs, namely dissolution in the near-neutral lung fluid and dissolution in the acidic environment (maintained at pH 4.5 to 5) created around fibres surrounded by macrophages in the lung. It is believed macrophages promote removal of the fibres from the lung by promoting local dissolution of the surrounded fibre area leading to weakening and breaking of the fibres so as to reduce the average fibre length, thereby enabling macrophages to engulf and transport the shorter fibres out of the lung. This mechanism is illustrated in the article by Morimoto et al in Occup. Environ. Med 1994, 51, 62–67 and especially FIGS. 3 and 7 and articles by Luoto et al in Environmental Research 66 (1994) 198–207 and Staub-Reinhaltung der Luft 52 (1992) 419–423.

Traditional glass fibres and many of the MMV fibres claimed to have increased solubility in lung fluid (at pH 7.5) have a worse solubility at pH 4.5 than at pH 7.5 and so presumably attack by macrophages would not contribute significantly to the shortening and final removal of the fibres from the lung.

Existing MMV fibres formed from rock, slag and other relatively high alkaline earth mixtures can have a higher dissolution rate at pH 4.5 than pH 7.5 but tend to have a low melt viscosity. Existing fibres which are promoted as being biologically acceptable do not have a satisfactory combination of dissolution rate at pH 4.5 with melt properties. Fibres which are currently alleged to be preferred on the basis of in vitro tests tend to have low melt viscosity when they have the required low aluminium content. The low melt viscosity inevitably reduces production efficiency compared to normal production.

It would be desirable to provide MMV fibres which can be shown to be biodegradable in the lung, have melt properties which allow for normal, high, production efficiency and which can be made from inexpensive raw materials. Preferably they have good weathering resistance when exposed to ambient humid conditions in use.

SUMMARY OF THE INVENTION

In the invention we use, as fibres having satisfactory biological solubility, fibres which have a dissolution rate measured at pH 4 to 5 of at least 20 nm per day and which are formed of a composition having a melt viscosity at 1,400° C. of 10–70 poise. For instance the dissolution rate at pH 4.5 can be at least 30 or even at least 50 nm per day or more.

The combination of the melt viscosity and the solubility at pH 4.5 means that we can use a melt which is convenient to fiberise by conventional techniques and can produce fibres which are biologically soluble at pH 4.5. It is new to formulate or select fibres according to this combination, and many such fibres have a novel composition.

According to the invention, man-made vitreous fibres are formed of a composition which has a viscosity at 1400° C. of 10 to 70 poise and which has an analysis, measured as weight of oxides, which includes:

| | |
|---|---|
| $SiO_2$ | 32 to 48% |
| $Al_2O_3$ | 18 to 30% |
| CaO | 10 to 30% |
| MgO | 2 to 20% |
| FeO | 2 to 15% |
| $Na_2O + K_2O$ | 0 to 10% |
| $TiO_2$ | 0 to 6% |
| Other Elements | 0 to 15% | and the fibres have a dissolution rate at pH 4 to 5 of at least 20 nm per day.

Particularly preferred novel fibres are those in which the amount of $SiO_2$ is not more than 42.0%. Preferably the amount of $Al_2O_3$ is at least 19.0% and most preferably at least 20.0%. Other preferred amounts of the novel fibres are disclosed in U.S. Ser. No. 08/836537, identified above and incorporated herein by reference.

The invention also includes novel external wall or roof claddings and also pipe sections.

DESCRIPTION OF PREFERRED EMBODIMENTS

In a preferred aspect of the invention we determine the melt viscosity and the fibre dissolution rate at a pH in the range 4–5 of one or more compositions, we select a composition which has a melt viscosity at 1400° C. of 10 to 70 poise and provides fibres which have a dissolution rate at pH 4.5 of at least 20 nm per day and which has an analysis, measured as weight of oxides, which includes:

| | |
|---|---|
| $SiO_2$ | 32 to 48% |
| $Al_2O_3$ | 10 to 30% |
| CaO | 10 to 30% |
| MgO | 2 to 20% |
| FeO | 2 to 15% |
| $Na_2O + K_2O$ | 0 to 12% |
| $TiO_2$ | 0 to 6% |
| Other Elements | 0 to 15% | and we make fibres from this composition.

The method also includes processes in which the initial selection of the composition on the basis of solubility and viscosity is achieved by determining the solubility of the fibres in the environment of macrophages in the lung.

It is surprisingly possible, in accordance with the invention, to provide fibres which have a good dissolution rate at pH 4.5 thereby facilitating clearance from the lungs by macrophages (thus promoting genuine biodegradability), even though the fibres can have low or moderate dissolution rate at pH 7.5. This allows maintenance of good stability under humid conditions (without loss of biodegradability). The fibres can have reasonably conventional melt characteristics such as liquidus temperature, crystallisation rate and melt viscosity. The fibres can be formed using inexpensive raw materials.

Another advantage of the fibres is that when they are exposed to humidity and condensed water, the resultant solution that is formed containing dissolution products has increased pH but the fibres may have reduced solubility at increased pH and so they may dissolve less and have increased durability.

The invention broadly includes all MMVF products made from a composition having the melt viscosity at 1,400° C. of 10–70 poise and wherein the manufacture, promotion or sale or use involves measurement of, or reference to measurement of, solubility at about pH 4.5 (e.g., 4 to 5) and/or in the environment of macrophages in the lung irrespective of whether the dissolution rate is measured during the actual production of such products. The fibres preferably have an analysis as stated above.

The invention includes the use of the stated composition to promote the removal of MMVF fibres from human lungs. The invention also includes the use of the stated fibres to impart the ability to be rejected from human lungs.

The invention includes MMVF products, including MMV fibres, made from a composition which has been selected in order to provide the stated solubility. For instance it includes the measurement of pH 4–5 solubility and the melt viscosity of one or more compositions and selecting a composition partly or wholly on the basis of observing melt viscosity and solubility value at pH 4–5, and utilising compositions having the same or substantially the same analysis for making MMVF products. Any deviations in the analysis must be sufficiently small that they do not significantly alter the pH 4–5 solubility. When conducting the measurements to allow a selection of fibres to be made, the solubility can be determined at any pH (usually in the range 4–5) which correlates to the pH at 4.5. The melt viscosity can be determined either by deduction from data or by measurement and/or calculation, for any temperature (usually in the range 1,370–1,450° C.) which gives a value which correlates with the value at 1,400° C.

The selection of the composition does not have to be conducted at the same location or at about the same time as carrying out the commercial production using the selected composition. Thus a manufacturer may conduct tests, or sponsor others to conducts tests, to determine solubility and use the information from these tests as part of the basis for selecting the composition which is used for making the fibres commercially.

The invention includes products having the quoted analysis and are formed from a composition having the quoted melt viscosity and which are labelled or sold as having the defined dissolution rate at pH 4–5. The invention includes packages which contain MMV fibres and which carry a label or insert, or which are sold with advertising, which refers to solubility at pH in the range 4–5 or in the environment of macrophages or which refers to a test method which measures such solubility.

The invention includes novel MVVF products. These include horticultural MMVF growth media and fibre reinforcement wherein the fibres are as defined in the invention.

One class of fibres which are novel are fibres having the solubility, melt viscosity and composition analysis given above except that the amount of $Al_2O_3$ is at least 18%. Other useful fibres have $Al_2O_3$ above 16%. Often it is above 19 or 20%, for instance up to 26 or 28%. In fibres having $Al_2O_3$ above 16% the combined amount of alkali ($Na_2O+K_2O$) is usually at least 1% and preferably at least 2%, up to 7% or 10% or more. The amount of alkali is usually below 5% and preferably below 3% when the amount of $Al_2O_3$ is above 16%. These fibres can have good fire resistance and other mechanical properties. When these properties are of less importance, fibres having useful pH 4.5 solubility can be obtained with amounts of $Al_2O_3$, below 16% and amounts of $Na_2O+K_2O$ above 6 or 7%, for instance 8 to 12%, usually 8–10%.

Another class of fibres which are novel are fibres which preferably have the solubility and melt viscosity given above and which have the general analysis given above except that the alkali ($Na_2O+K_2O$) is above 6% and the amount of $Al_2O_3$ is usually 12–18%, and is often not more than 16% preferably 13–16%. Often the composition contains 0.5–4% $TiO_2$, usually 1–2% $TiO_2$. The alkali is usually provided by at least 5% and often at least 7%, $Na_2O$. The total amount of alkali ($Na_2O+K_2O$) is preferably 8–12%, often 8–10%.

It is possible to select elemental analyses within the general ranges given above so as to obtain the defined combination of melt viscosity and dissolution rate at pH 4.5. Also, it is easily possible to select the composition such that the composition and the fibres comply with other desirable properties, such as liquidus temperature and sintering temperature.

For instance, if it is found that the viscosity at 1400° C. of any particular melt is too high, it may be possible to reduce it by reducing the total amount of $SiO_2+Al_2O_3$. Similarly, if the melt viscosity is too low, it may be possible to increase it by raising the total amount of $SiO_2+Al_2O_3$, generally within the range of 55 to 75%, often 60 to 75%, or by increasing the amount of alkali oxide. Similarly, it may be possible to decrease the viscosity by increasing the total amount of alkaline earth metal oxide components and FeO.

If the rate of dissolution at pH 4.5 is too low it may be possible to increase it by decreasing the amount of $SiO_2$, but it may then be necessary to increase the amount of $Al_2O_3$ (and/or to add a component such as $P_2O_5$) in order to maintain melt properties.

The amount of $SiO_2$ is normally at least 32%, often at least 34% and preferably at least 35%. It is normally below 47% and preferably below 45% and is often 38–42%. However amounts of 42 to 47% are preferred when the amount of $Al_2O_3$ is not more than 16%.

The amount of $Al_2O_3$ is normally at least 12% and preferably at least 13%. When the amount of alkali is relatively low, good solubility at pH 4.5 can be obtained with $Al_2O_3$ amounts above 16 or 17%, especially at least 18%, but preferably at least 20% and often at least 24%. It is normally below 28% and preferably below 26%. Amounts of 20–23% are often preferred. However when the amount of alkali is relatively high (for instance at least 7% $Na_2O+K_2O$) good solubility at pH 4.5 can be obtained with $Al_2O_3$ amounts below 16%, eg 13–15%.

The combined amount of $SiO_2+Al_2O_3$ is normally 55 to 75%, usually at least 56% and preferably at least 57%. In preferred products it is often above 60%, most preferably at least 61 or 62%. It is normally below 70% or 68% and preferably below 65%. When the amount of $Al_2O_3$ is not more than 16%, the amount of $SiO_2+Al_2O_3$ is often 56–60%.

The amount of CaO is normally at least 14% and preferably at least 18%. It is normally below 28% and preferably below 25%. Amounts of 14–20% are often preferred.

The amount of MgO is normally at least 5%, preferably at least 6% and most preferably at least 8%. It is normally below 15%, preferably below 11%. When the amount of $Al_2O_3$ is not more than 16%, the amount is preferably 5–11%.

The amount of FeO is normally at least 3% and preferably at least 5%. It is normally below 12%, preferably below 10% and most preferably below 8%. Amounts of 5–7% are often preferred. Preferably CaO+MgO+FeO is 25 to 40%.

The composition often includes $TiO_2$ in an amount of up to 3% or 4%, usually up to 2%. The amount of $TiO_2$ is usually at least 0.2%, often at least 0.5 or 1%.

A variety of other elements can be present in the composition in any amount that does not detract from the desired properties Examples of other elements that can be included are $P_2O_5$, $B_2O_3$, BaO, $ZrO_2$, MnO, ZnO and $V_2O_5$.

It is often desirable to include $P_2O_5$ and/or $B_2O_3$ for instance to adjust melt properties or to adjust solubility. The total amount of $P_2O_5$ and $B_2O_3$ is generally not more than 10%. The amount of $P_2O_5$ is usually more than the amount of $B_2O_3$ and is usually at least 1% or 2%. Often $B_2O_3$ is absent. Preferably there is 1 to 8%, usually 1 to 5%, $P_2O_5$ and 0 to 5% $B_2O_3$ (often 1 to 4% $B_2O_3$).

The total amount of these various other elements is usually below 15% and often below 10% or 8%. Each of the other elements which is present is normally present in an amount of not more than 2%, except than $P_2O_3$ and/or $B_2O_3$ may be present in larger amounts as mentioned above.

The melt can have normal crystallisation characteristics, but when it is desired to minimise crystallisation this can be achieved by including magnesium in a rather low amount for instance 2 to 6% MgO.

When it is desired to provide fibres having improved fire resistance, it is generally desired to increase the amount of FeO, which preferably is then at least 6%, for instance up to 8% or higher, for instance 10%, and the MgO should then be at least 8%.

The analysis of the composition is preferably such that the fibres have a dissolution rate at pH 4.5 of at least 25, and preferably at least 40, nm per day. It is desirable for the dissolution rate to be as high as possible (consistent with retention of adequate humidity and heat resistance properties) but it is generally unnecessary for it to be above 150 or 100 nm per day and it is usually below 80 nm per day.

Although a high dissolution rate at pH 7.5 has been proposed as a desirable property (as an indication of alleged biodegradability), in fact it is often an undesirable property since it is an indication of poor weathering resistance when exposed to humidity. Dissolution in the lungs at pH 7.5 is not exclusively necessary for the fibres to be biodegradable. Preferably the fibres have a dissolution rate in Gambles solution at pH 7.5 of below 25, and most preferably below 15, nm per day.

The viscosity of the composition at 1400° C. is usually at least 12 or 15 poise and is preferably at least 18 poise. Although it can be as high as, for instance, 60 poise it is generally below 40 poise and preferably it is not more than 30 poise.

When it is desired that the fibres should have good fire resistance, the analysis is preferably such that the sintering temperature is at least 800° C. and preferably at least 1,000° C.

The liquidus temperature is usually at least 1200° C. but often at least 1240° C. It can be as high as, for instance, 1400° C. but preferably it is not more than 1340° C.

An advantage of the use of the moderate aluminium melts defined for use in the invention is that it permits the inclusion in the composition of readily available materials having a moderate aluminium content such as rock, sand and waste. This therefore minimises the need to use expensive, high alumina materials such as bauxite or kaolin, and minimises at the same time the need to use expensive very low alumina materials such as silica sand or olivine sand, iron ore, etc. These more expensive materials may however be useful if desired. Typical, readily available, medium alumina materials that may be used as part or all of the composition include anorthosite and phonolite and gabbros.

The composition is typically formed by blending appropriate amounts of naturally occurring rock and sand materials such as anorthosite, gabbros, limestone, dolomite, diabase, apatite, boron-containing materials, and waste materials such as mineral wool waste, alumina silicates, slag, in particular high alumina (20–30%) slags such as ladle slag, foundry sand, filter dust, fly ash, bottom ash and high alumina waste from the production of refractory materials.

The composition can be converted to a melt in conventional manner, for instance in a gas heated furnace or in an electric furnace or in a cupola furnace. An advantage of the invention is that the composition can easily have a reasonably low liquidus temperature (while maintaining adequate viscosity at 1400° C.) and this minimises the amount of energy that is required for forming the melt.

The melt can be converted to fibres in conventional manner, for instance by a spinning cup process or by a cascade rotor process, for instance as described in WO92/06047.

The fibres of the invention can have any convenient fibre diameter and length.

In this invention, dissolution rate is determined using the following test protocol.

300 mg of fibres are placed in polyethylene bottles containing 500 ml of a modified Gamble's solution (i.e., with complexing agents), adjusted to pH 7.5 or 4.5, respectively. Once a day the pH is checked and if necessary adjusted by means of HCl.

The tests are carried out during a one week period. The bottles are kept in water bath at 37° C. and shaken vigorously twice a day. Aliquots of the solution are taken out after one and four days and analysed for Si on a Perkin-Elmer Atomic Absorption Spectrophotometer.

The modified Gamble's solution has the following composition:

|  | g/l |
|---|---|
| $MgCl_2.6H_2O$ | 0.212 |
| NaCl | 7.120 |
| $CaCl_2.2H_2O$ | 0.029 |
| $Na_2SO_4$ | 0.079 |
| $Na_2HPO_4$ | 0.148 |
| $NaHCO_3$ | 1.950 |
| $(Na_2$-tartrate$).2H_2.O$ | 0.180 |
| $(Na_3$-citrate$).2H_2O$ | 0.152 |
| 90% lactic acid | 0.156 |
| Glycine | 0.118 |
| Na-pyruvate | 0.172 |
| Formalin | 1 ml |

The fibre diameter distribution is determined for each sample by measuring the diameter of at least 200 individual fibres by means of the intercept method and a scanning electron microscope or optical microscope (1000× magnification). The readings are used for calculating the specific surface of the fibre samples, taking into account the density of the fibres.

Based on the dissolution of $SiO_2$ (network dissolution), the specific thickness dissolved was calculated and the rate of dissolution established (nm/day). The calculations are based on the $SiO_2$ content in the fibres, the specific surface and the dissolved amount of Si.

In this specification, the sintering temperature is determined by the following test protocol.

A sample (5×5×7.5 cm) of mineral wool made of the fibre composition to be tested is placed in a furnace pre-heated to 700° C. After 1.5 hours exposure the shrinkage and the sintering of the sample were evaluated. The method is repeated each time with a fresh sample and a furnace temperature 50° C. above the previous furnace temperature until the maximum furnace temperature, at which no sintering or no excessive shrinkage of the sample is observed, was determined.

In this specification, the viscosity in poise at 1400° C. is calculated according to Bottinga and Weill, American Journal of Science Volume 272, May 1972, page 455–475.

The following are examples of the invention.

Compositions were formed by blending appropriate proportions of raw materials as shown in the table and each was melted in a crucible furnace and was fiberised by the cascade spinner technique. The melt viscosity and solubility of each was determined. The analyses of the compositions and their properties are quoted in the following tables. In the invention, any of compositions A to X are judged to be suitable and are selected for the subsequent manufacture of MMVF products which are labelled as having good biological solubility. Those having viscosity above 20 and pH 4.5 solubility above 30 are preferred.

Product 1 is similar to, commercial slag wool and gives a poor viscosity. Product 2 is a high aluminium product but the proportions of all the components are such that the melt viscosity is too high for convenient spinning. Product 3 is similar to a conventional rock wool product with normal good product properties but has a very low dissolution rate at pH 4.5. Accordingly products 1, 2 and 3 are not selected for use in the manufacture of biologically soluble MMV fibre products.

| Fibre Types | $SiO_2$ % | $Al_2O_3$ % | $TiO_2$ % | FeO % | CaO % | MgO % | $Na_2O$ % | $K_2O$ % | SUM | Vis poise 1400° C. | Diss rate pH 7.5 (st) nm/day | Diss rate pH 4.5 (st) nm/day | Sintering temp ° C. |
|---|---|---|---|---|---|---|---|---|---|---|---|---|---|
| A | 34.5 | 28.0 | 1.8 | 3.3 | 25.4 | 5.6 | 0.6 | 0.8 | 100.0 | 21.2 | 9.5 | 34.8 | >800 |
| B | 36.2 | 26.3 | 1.9 | 4.9 | 17.7 | 10.8 | 1.0 | 1.1 | 100.0 | 19.4 | 6.8 | 45.1 | >800 |
| C | 38.3 | 25.0 | 1.7 | 3.0 | 24.9 | 5.6 | 0.7 | 0.8 | 100.0 | 24.7 | 7.4 | 53.8 | >800 |
| D | 38.1 | 24.7 | 1.8 | 4.6 | 17.4 | 11.3 | 1.2 | 0.8 | 100.0 | 20.0 | 7.9 | 64.2 | >800 |
| E | 43.2 | 20.0 | 1.6 | 5.0 | 16.6 | 11.5 | 1.2 | 0.8 | 100.0 | 22.8 | 5.0 | 57.9 | >800 |

-continued

| Fibre Types | SiO$_2$ % | Al$_2$O$_3$ % | TiO$_2$ % | FeO % | CaO % | MgO % | Na$_2$O % | K$_2$O % | SUM | Vis poise 1400° C. | Diss rate pH 7.5 (st) nm/day | Diss rate pH 4.5 (st) nm/day | Sintering temp ° C. |
|---|---|---|---|---|---|---|---|---|---|---|---|---|---|
| F | 43.2 | 19.8 | 1.5 | 3.4 | 24.7 | 5.6 | 1.0 | 0.8 | 100.0 | 27.1 | 4.8 | 47.0 | >800 |
| G | 47.7 | 19.4 | 0.8 | 3.7 | 16.6 | 10.8 | 0.4 | 0.4 | 100.0 | 34.7 | 3.0 | 21.0 | >800 |
| H | 43.7 | 18.8 | 3.6 | 5.4 | 16.4 | 9.7 | 1.8 | 0.7 | 100.0 | 25.1 | 5.8 | 38.6 | >800 |
| I | 45.6 | 18.1 | 1.5 | 5.3 | 16.5 | 9.7 | 2.5 | 0.7 | 100.0 | 30.8 | 3.1 | 44.4 | >800 |
| J | 46.9 | 18.9 | 0.5 | 3.3 | 17.0 | 9.5 | 3.4 | 0.5 | 100.0 | 44.0 | 0.9 | 35.2 | >800 |
| K | 44.1 | 18.7 | 1.6 | 5.2 | 16.5 | 9.8 | 3.3 | 0.7 | 100.0 | 30.3 | 2.6 | 41.1 | >800 |
| L | 39.6 | 24.3 | 1.8 | 3.2 | 21.7 | 6.7 | 1.8 | 0.8 | 100.0 | 30.8 | 5.7 | 49 | >800 |
| M | 43.8 | 20.4 | 1.2 | 10.3 | 15.6 | 8.3 | 0.2 | 0.3 | 100.0 | 21.9 | 3.9 | 39.7 | >1000 |
| N | 42.9 | 23.2 | 0.7 | 8.8 | 17.5 | 5.1 | 0.6 | 1.4 | 100.0 | 36.8 | — | 45.9 | >900 |
| O | 43.1 | 19.9 | 1.6 | 10.1 | 15.0 | 9.3 | 0.6 | 0.4 | 100.0 | 19.8 | 4.6 | 51.9 | >1000 |
| P | 37.8 | 18.3 | 0.9 | 12.0 | 15.8 | 10.1 | 4.7 | 0.3 | 100.0 | 15.0 | 10.2 | 61.5 | >1000 |
| Q | 40.0 | 22.2 | 2.0 | 7.5 | 15.2 | 10.7 | 1.5 | 0.8 | 100.0 | 19.4 | 7.1 | 61.1 | >1000 |
| R | 45.4 | 14.5 | 1.6 | 5.6 | 15.3 | 7.2 | 9.0 | 0.9 | 100.0 | 39.9 | 3.1 | 48.1 | >1000 |
| S | 45.3 | 17.5 | 1.1 | 5.7 | 20.3 | 7.8 | 1.7 | 0.6 | 100.0 | 25.9 | 1.8 | 48.6 | >1000 |
| T | 43.1 | 14.0 | 0.7 | 0.5 | 34.3 | 5.2 | 0.7 | 1.5 | 100.0 | 15.2 | 1.5 | 59.8 | >700 |
| U | 37.2 | 16.1 | 1.6 | 3.3 | 21.5 | 10.1 | 9.3 | 1.0 | 100.0 | 29.2 | 5.2 | 48.0 | >800 |
| V | 42.9 | 16.6 | 1.7 | 6.4 | 16.8 | 9.6 | 5.2 | 0.8 | 100.0 | 25.3 | 3.1 | 21.9 | >1000 |
| W | 38.9 | 16.4 | 1.4 | 8.4 | 20.0 | 7.9 | 6.4 | 0.6 | 100.0 | 20.2 | 9.5 | 33.0 | >1000 |
| X | 42.5 | 16.4 | 1.7 | 5.8 | 21.1 | 6.3 | 5.4 | 0.8 | 100.0 | 27.1 | 4.1 | 32.9 | >1000 |
| 1 | 42.7 | 8.8 | 0.3 | 0.4 | 36.9 | 9.4 | 0.7 | 0.3 | 100.0 | 8.2 | 13.9 | 41.1 | >700 |
| 2 | 39.7 | 32.8 | 1.7 | 7.0 | 15.7 | 2.1 | 0.3 | 0.7 | 100.0 | 100.0 | 7.8 | 59.3 | >1000 |
| 3 | 46.9 | 13.2 | 3.0 | 6.4 | 17.1 | 9.4 | 2.6 | 1.3 | 100.0 | 23.7 | 2.0 | 3.0 | >1000 |

The selected fibres may be provided in any of the forms conventional for MMV fibres. Thus they may be provided as a product consisting of loose, unbonded fibres. More usually they are provided with a bonding agent, for instance as a result of forming the fibres and connecting them in conventional manner. Generally the product is consolidated as a slab, sheet or other shaped article.

Products according to the invention may be formulated for any of the conventional purposes of MMV fibres, for instance as slabs, sheets, tubes or other shaped products that are to serve as thermal insulation, fire insulation and protection or noise reduction and regulation, or in appropriate shapes for use as horticultural growing media, or as free fibres for reinforcement of cement, plastics or other products or as a filler.

The invention is of particular value for the production of bonded MMVF batts constructed for use as external roof or wall claddings in buildings or in building components, or constructed for use as internal or external pipe sections around pipe or pipe fittings.

The invention includes the MMVF cladding batts themselves, their use as external wall or roof cladding in buildings and building components which are to be on the exterior of a building, and the buildings or building components themselves which include the defined MMVF batts. The invention includes the use of pipe sections for insulating pipes.

The building or building component generally comprises a metal, wood or other frame work on to which the MVVF batts are secured in a position such that they will be on the exterior of the building in use. The building may be an entire building, but the invention also includes building components, for instance a roof structure or wall structure. For instance the roof or wall structure ,may constitute an entire roof or wall for a building or several such structures, each containing a plurality of batts, may be assembled on site to provide a roof or wall.

The cladding batt as initially manufactured (ie before leaving the plant where it is manufactured) or before installation in or on the building component or building is often provided with a substantially overall or impermeable coating on its external surface. This protective coating may be of water-repellant materials such as roofing felt or it may be of a foil or a decorative material such as paint. Even if such a coating is not applied before assembly, the external surface of the batt or batts in the building component or building are usually provided with a coating. For instance roof boards may be coated with roof felt, asphalt, wood plate, vlies, foil or solar heating units. The roof boards are preferably sufficiently stiff that one can walk on them. Wall cladding may be coated with plaster (either inorganic or organic), cement, paint, polyurethane, roof felt, foil (for instance aluminium), glass or solar heating units.

One type of cladding batt according to the invention is a very high density MMVF batt, typically having a density 500 to 2,000 Kg/m$^3$, often 700 to 1,200 Kg/m$^3$. This high density product usually carries a coating of paint or other substantially impermeable or overall surface covering. Other batts according to the invention may have lower density than this and can be roof boards or wall boards of more conventional construction.

The cladding batts of the invention usually have a density of at least 50 Kg/m$^3$ and often at least 70 Kg/m$^3$, typically up to 500 Kg/m$^3$. Batts of differing densities can be laid one upon the other in use, with the higher density batt usually on the outside.

Preferred cladding products of the invention have a multi-density construction, usually a dual density construction, with the MMVF layer which is on the outside of the building in use having a higher density than, and formed substantially integral with, the remainder of the MMVF batt. For instance the outer layer usual has a density of at least 60 Kg/m$^3$ and preferably at least 70 or 80 Kg/m$^3$, and often it has a density of at least 20 Kg/m$^3$, and frequently at least 50 Kg/m$^3$, above the density of the layer beneath it. The high density outer layer is usually at least 5 mm thick, often 10 to 40 mm thick and typically constitutes 2 to 30%, often 3 to 15 or 20%, of the total thickness of the MMVF batt.

The cladding batts are usually square or rectangular slabs but can have other, more complex, shapes, especially when they form parts of roofs. The batts generally have a thickness of 10 to 500 mm. The thicker batts are stiff and are provided as slabs but some of the thinner batts, for instance as facade or wall boards, may sometimes be supplied as a roll of sheet material.

The cladding batts and pipe sections are usually bonded by incorporation of conventional phenolic or other binder, typically in amounts of 1 to 5%, often 2 to 4%, by weight of the batt.

Water-repellent material may additionally be included in the cladding batts and pipe sections during manufacture in conventional manner, for instance an oil may be included to improve water-repellency. The total ignition loss of the batts is generally in the range 2 or 3% up to 5 or 6%.

The batts can be made by any of the conventional techniques known for making batts of the desired construction for description of suitable methods of making and using external MMVF wall and roof cladding and pipe sections, reference should be made to any or all of EP 133,083, 277,500, 420,837, 435,942, 518,964, 521,058, 560,878, 590, 098 and 654,100, GB 1,027,799 and 2,223,248, DK 155,163 and DK-U3-9200033, DE-U1-29616962, DE 4,143,387, 4,319,340 and 4,432,866, and WO94/16162, 94/16163, 94/16164 and 95/20708, and WO89/07731, WO89/07733, WO96/37728 and WO97/01060. All these are incorporated herein by reference.

The fibres may be substantially parallel to the external face of the batt or the fibres may be substantially perpendicular to the face of the batt, the product then being of the type conventionally known as a lamellar batt or slab.

External roof cladding can have any of the normal configurations of roof boards or other roof cladding and generally has a density in the range 100 to 400, preferably 100 to 200, $Kg/m^3$ and a thickness of 10 to 500, usually 10 to 300 mm.

Single layer roof boards often have a density of 100–300 $kg/m^3$ and a thickness of 10–300 mm. Instead of using a single layer, several layers may be applied one on top of the other, for instance as a combination of lamellar and normal batts, but preferably with the outer layer having the highest density and/or being a lamellar batt. Preferred roof cladding is formed of dual density batts. The density of the bottom may be 60–200 $kg/m^3$ and the density of the top is usually at least 50 $kg/m^3$ more and is usually 200–400 $kg/m^3$. The thickness of the top may be at least 15 mm and the thickness of the bottom may be 100–300 mm. The maximum total thickness is usually 350 mm.

Wall cladding can be of two types. The first type is what is commonly known as a facade board. The other type of wall cladding is often known as a lamella board. The wall cladding generally has a density in the range 50 to 400, often 50 to 200 $Kg/m^3$, often around 50 to 150 $Kg/m^3$. For instance facade boards may have a density of around 70 to 150 $Kg/m^3$ whilst lamellar boards may have a density of 50 to 100 or 150 $Kg/m^3$. They may have a thickness typically of 10 to 300, often 10 to 200 mm.

Lamella boards can be made with lower densities compared to the normal single layer boards. Furthermore, lamella boards can resist the influence of the wind (delamination strength), which can be a problem with normal, single layer boards having the same density. Lamella boards normally have an impermeable surface coating, for instance of wood, foil, roofing felt or other substantially impermeable sheet material.

Typical facade boards have a width of 20 cm or more, e.g., 60 cm, and can typically have a length of 1–2 metres (e.g., 1.2 m) but can be a roll (e.g., 10 m). Roof boards usually have a width of above 50 cm (e.g., 60 cm or 120 cm up to 150 cm) and a length which is more (e.g., 90 cm up to 300 cm, e.g., 180 or 140 cm).

Pipe sections are used for heating insulation, cooling insulation or condensing insulation around internal or external pipes and pipe fittings. Condensing insulation has a thickness or shape designed so that vapour condenses on the outer surface of the pipe section and/or so that condensed vapour is drained out of the pipe section in order to prevent corrosion of the pipes (see EP 739,470, WO94/05947; EP 528,936, WO97/16676)

The sections can be covered with impermeable aluminium foil or plates; paper coated with aluminium; metal plates, i.e., steel plates, preferably galvanised metal plates, with a corrosion-preventing plastic film or coating; roofing felt; or woven or non-woven glass fibre fleece or cloth. Also the pipe sections may be coated with: canvas, paint, plastic foil, i.e., PVC, cardboard or paper. The covering material can be impregnated with bitumen in order to be weather resistant.

The covering material can be fire resistant.

Usually pipe sections have a density from 40–400 $Kg/m^3$, preferably 60–300 $Kg/m^3$. The pipe sections may include support rings which are part of the insulation. Pipe sections may consist of two types of wool, one type for the pipes and another more dense type for the support rings. These support rings have the purpose for cold pipes to avoid condensation and for hot pipes to avoid thermal loss. Pipe section support rings usually have densities from 150–400 $Kg/m^3$ preferably 250–350 $Kg/m^3$ and preferred around 300 $Kg/m^3$. Wool for the remainder of the pipe section typically has density of 40–200 $Kg/m^3$, preferably 60–180 $Kg/m^3$.

The cladding and sections can be made of any of the fibres defined above but preferably they are made of fibres which have a composition

| | |
|---|---|
| $SiO_2$ | 30 to 48% |
| $Al_2O_3$ | 18 to 30% |
| CaO | 10 to 30% |
| MgO | 2 to 5% (Preferably not more than 4.5%) |
| FeO | 2 to 15% |
| $Na_2O + K_2O$ | 0 to 10% |
| $TiO_2$ | 0 to 6% |
| Other Elements | 0 to 15% | or which have a composition

| | |
|---|---|
| $SiO_2$ | 32 to 48% |
| $Al_2O_3$ | 18 to 30% |
| CaO | 10 to 30% |
| MgO | 2 to 20% |
| FeO | 9 to 15% (preferably 9.5 to 11%) |
| $Na_2O + K_2O$ | 0 to 10% |
| $TiO_2$ | 0 to 6% |
| Other Elements | 0 to 15% | or which have a composition

| | |
|---|---|
| $SiO_2$ | 30 to 48% |
| $Al_2O_3$ | 10 to 18% (preferably 14 to 18%) |
| CaO | 10 to 30% |
| MgO | 2 to 20% |
| FeO | 2 to 15% |

-continued

| wt % | |
|---|---|
| Na$_2$O + K$_2$O | 0 to 6% |
| TiO$_2$ | 0 to 6% |
| Other Elements | 0 to 15% |

The following are examples of suitable compositions for external cladding or pipe sections.

| wt % | A | B | C | D | E | F | G |
|---|---|---|---|---|---|---|---|
| SiO$_2$ | 45.1 | 42.9 | 43.4 | 43 | 44.1 | 43.1 | 42.2 |
| Al$_2$O$_3$ | 19.4 | 21.2 | 20.8 | 21.3 | 21.5 | 23 | 23.4 |
| TiO$_2$ | 1.0 | 1.0 | 1.4 | 1.8 | 1.5 | 1.7 | 1.6 |
| FeO | 2.9 | 2.9 | 8.4 | 8.7 | 9.7 | 10.1 | 9.5 |
| CaO | 27.4 | 28.5 | 21.4 | 18.2 | 17.9 | 15.1 | 14.5 |
| MgO | 3.0 | 3.1 | 3.0 | 4.5 | 2.9 | 4.9 | 7.2 |
| Na$_2$O | 0.7 | 0.1 | 1.0 | 1.8 | 1.7 | 1.0 | 0.8 |
| K$_2$O | 0.4 | 0.3 | 0.5 | 0.7 | 0.6 | 0.9 | 0.8 |
| SUM | 100 | 100 | 100 | 100 | 100 | 100 | 100 |
| Sinter temp ° C. | 800 | 800 | 1000 | 1100 | 1100 | 1100 | 1100 |
| Viscosity (poise, 1400° C.) | 34 | 27 | 33 | 35 | 39 | 40 | 34 |
| Dissolution rate pH 4.5 nm/day | 58 | 79 | 59 | 49 | 46 | 55 | 51 |

Other suitable compositions for use as external cladding or pipe sections include:

| Composition | SiO$_2$ | Al$_2$O$_3$ | TiO$_2$ | FeO | CaO | MgO | Na$_2$O | K$_2$O | Sintering temp | Viscosity poise 1400° C. | Dissolution rate pH 4.5 nm per day |
|---|---|---|---|---|---|---|---|---|---|---|---|
| H | 44.7 | 15.8 | 1.2 | 4.8 | 17.7 | 11.7 | 3.2 | 0.6 | 900 | 22 | 59 |
| I | 44.1 | 17.7 | 1.5 | 6.0 | 16.5 | 11.6 | 1.3 | 1.3 | 900 | 21 | 56 |
| J | 42.9 | 16.6 | 1.7 | 6.3 | 16.8 | 9.6 | 5.2 | 0.8 | >1000 | 25 | 22 |
| K | 45.5 | 16.2 | 1.9 | 6.8 | 15.8 | 11.8 | 1.9 | 0.3 | 1.000 | 20 | 25 |
| L | 44.9 | 15.7 | 1.8 | 6.7 | 20.3 | 7.9 | 2.4 | 0.3 | 1.000 | 21 | 34 |
| M | 37.7 | 16.8 | 1.5 | 14.3 | 15.7 | 10.4 | 3.3 | 0.3 | >1000 | 11 | 47 |

What is claimed is:

1. A product comprising man-made vitreous fibres formed of a composition which includes, by weight of oxides,

| | |
|---|---|
| SiO$_2$ | 32 to 48% |
| Al$_2$O$_3$ | 18 to 30% |
| CaO | 10 to 30% |
| MgO | 2 to 20% |
| FeO | 2 to 15% |
| Na$_2$O + K$_2$O | 0 to 10% |
| TiO$_2$ | 0.5 to 6% |
| Other Elements | 0 to 15% | and the composition has a viscosity at 1400° C. of 10 to 70 poise,
and the fibres have a dissolution rate determined from the silica concentration in solution one day and four days after shaking the fibres in Gambles solution at pH 4.5 of at least 20 nm per day.

2. A product according to claim 1 in which the amount of MgO is 5 to 20%, the amount of FeO is 5 to below 10%, the amount of TiO$_2$ is 0.5 to 4%, the amount of other elements is 0 to below 8%, and the viscosity is 12 to 70 poise.

3. A product according to claim 1 in which the amount of SiO$_2$ is not more than 42.0% and the amount of Al$_2$O$_3$ is at least 19.0%.

4. A product according to claim 1 in which the amount of SiO$_2$ is not more than 42.0% and the amount of Al$_2$O$_3$ is at least 20.0%.

5. A method of making man-made vitreous fibre products comprising selecting a composition in the form of a mineral melt and forming fibres from the melt wherein a melt viscosity and a fibre dissolution rate in the presence of macrophages are determined for the composition and a composition is selected which has a viscosity at 1400° C. of 10 to 70 poise and which provides fibres which have a dissolution rate determined from the silica concentration in solution one day and four days after shaking the fibres in Gambles solution at pH 4.5 of at least 20 nm per day, and which includes, by weight of oxides,

| | |
|---|---|
| SiO$_2$ | 32 to 48% |
| Al$_2$O$_3$ | 10 to 30% |
| CaO | 10 to 30% |
| MgO | 2 to 20% |
| FeO | 2 to 15% |
| Na$_2$O + K$_2$O | 0 to 12% |
| TiO$_2$ | 0 to 6% |

-continued

| | |
|---|---|
| Other Elements | 0 to 15% | and vitreous fibres are made from the selected composition.

6. A package containing a man-made vitreous fibre product wherein the fibres are formed of a composition having an analysis, as oxides, which includes

| | |
|---|---|
| SiO$_2$ | 32 to 48% |
| Al$_2$O$_3$ | 10 to 30% |
| CaO | 10 to 30% |
| MgO | 2 to 20% |
| FeO | 2 to 15% |
| Na$_2$O + K$_2$O | 0 to 12% |
| TiO$_2$ | 0 to 6% |
| Other Elements | 0 to 15% | and the composition has a viscosity at 1400° C. of 10 to 70 poise, and the fibres have a dissolution rate determined from the silica concentration in solution one day and four days after shaking the fibres in Gambles solution at pH 4.5 at least 20 nm per day, and the package includes a label or insert referring to solubility at pH 4 to 5 and/or in environment created by macrophages in lung fluid.

7. A product comprising man-made vitreous fibres formed of a composition having an analysis, as oxides, which includes

| | |
|---|---|
| SiO$_2$ | 32 to 48% |
| Al$_2$O$_3$ | 10 to 18% |
| CaO | 10 to 30% |
| MgO | 2 to 20% |
| FeO | 2 to 15% |
| Na$_2$O + K$_2$O | 6 to 12% |
| TiO$_2$ | 0 to 6% |
| Other Elements | 0 to 15% | and the composition has a viscosity at 1400° C. of 10 to 70 poise, and the fibres have a dissolution rate determined from the silica concentration in solution one day and four days after shaking the fibres in Gambles solution at pH 4.5 of at least 20 nm per day.

8. Vitreous fibres which are biologically acceptable utilising fibres of a composition which includes, by weight of oxides,

| | |
|---|---|
| SiO$_2$ | 32 to 48% |
| Al$_2$O$_3$ | 12 to 30% |
| CaO | 10 to 28% |
| MgO | 2 to 20% |
| FeO | 2 to 15% |
| Na$_2$O + K$_2$O | 0 to 12% |
| TiO$_2$ | 0 to 4% |
| Other Elements | 0 to 8% | which has a viscosity at 1400° C. of 10 to 70 poise and which provides fibres which have a dissolution rate determined from the silica concentration in solution one day and four days after shaking the fibres in Gambles solution at pH 4.5 of at least 20 nm per day.

9. Vitreous fibres according to claim 8 in the form of a bonded MMVF batt suitable for use as external roof or wall cladding or as pipe sections.

10. Vitreous fibres according to claim 8 which the amount of Al$_2$O$_3$ is 12 to 28%.

11. Vitreous fibres according to claim 10 in which the amount of Al$_2$O$_3$ is 18 to 26%.

12. Vitreous fibres according to claim 8 in which the amount of FeO is 5 to 10%.

13. Vitreous fibres according to claim 8 which the amount of TiO$_2$ is 0.5 to 4%.

14. Vitreous fibres according to claim 8 in which the combined amount of SiO$_2$ and Al$_2$O$_3$ is 56 to 68%.

15. A package according to claim 6 in which the amount of Al$_2$O$_3$ is 12 to 28%.

16. A package according to claim 6 in which the amount of Al$_2$O$_3$ is 18 to 26%.

17. A package according to claim 6 in which the amount of FeO is 5 to 10%.

18. A package according to claim 6 which the amount of TiO$_2$ is 0.5 to 4%.

19. A package according to claim 6 which the combined amount of SiO$_2$ and Al$_2$O$_3$ is 56 to 68%.

20. A method according to claim 5 in which the amount of Al$_2$O$_3$ is 12 to 28%.

21. A method according to claim 5 in which the amount of Al$_2$O$_3$ is 18 to 26%.

22. A method according to claim 5 in which the amount of FeO is 5 to 10%.

23. A method according to claim 5 which the amount of TiO$_2$ is 0.5 to 4%.

24. A method according to claim 5 which the combined amount of SiO$_2$ and Al$_2$O$_3$ is 56 to 68%.

* * * * *